R. L. & F. J. FRINK.
METHOD OF DRAWING GLASS.
APPLICATION FILED MAR. 18, 1910.
972,616.
Patented Oct. 11, 1910.
2 SHEETS—SHEET 1.
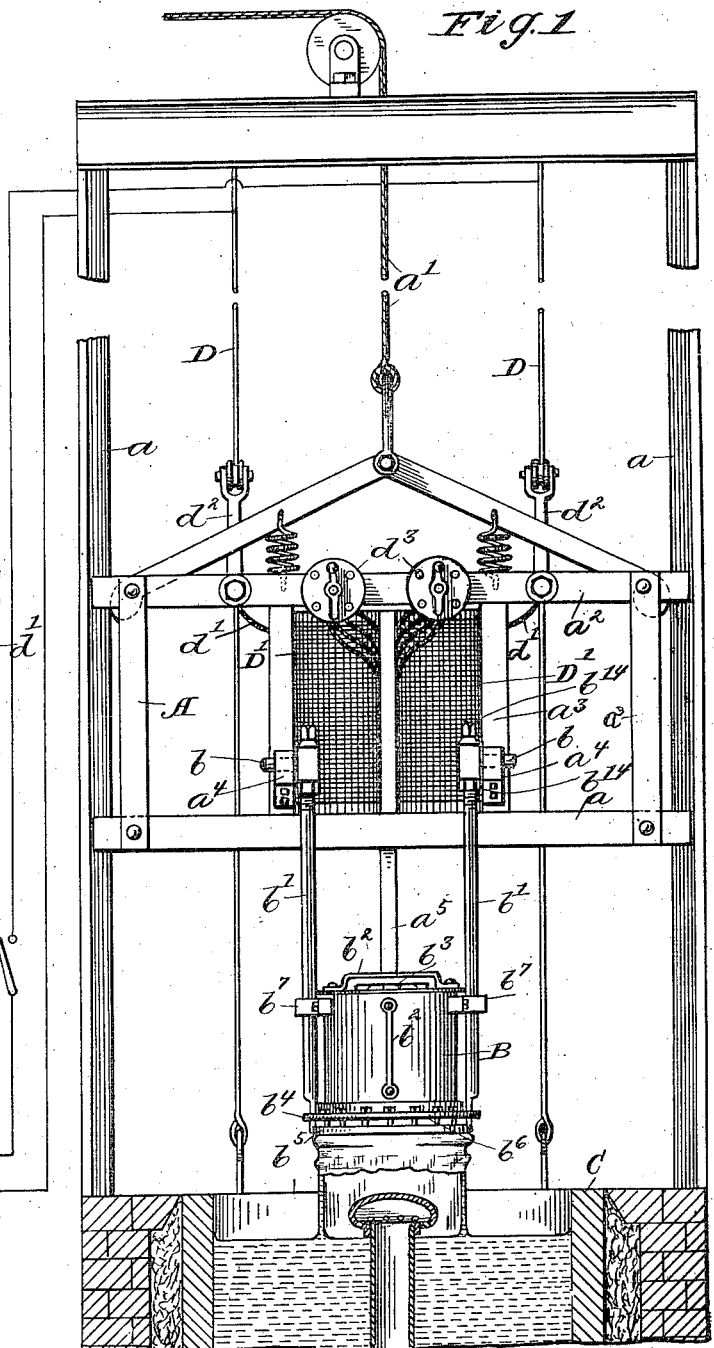
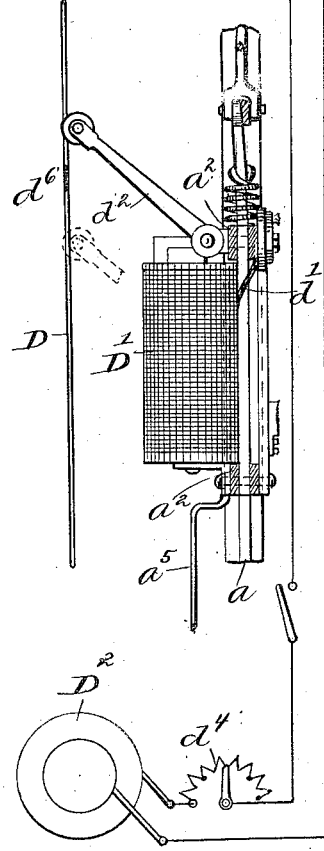

R. L. & F. J. FRINK.
METHOD OF DRAWING GLASS.
APPLICATION FILED MAR. 18, 1910.
972,616.
Patented Oct. 11, 1910.
2 SHEETS—SHEET 2.
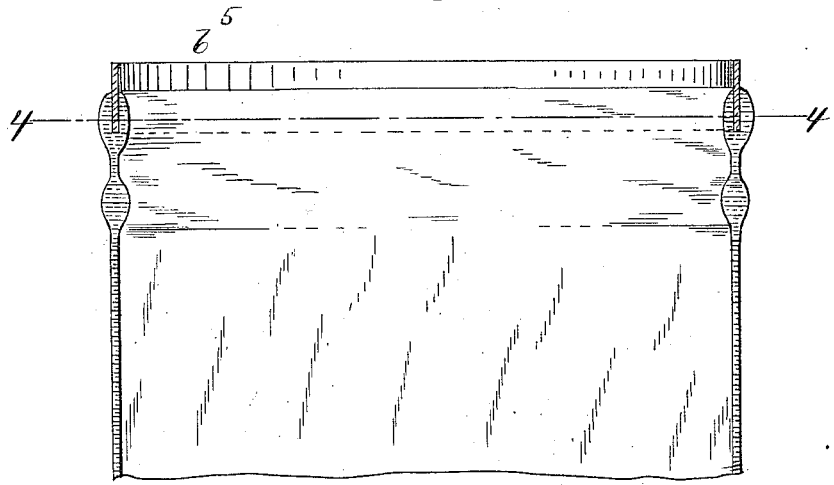
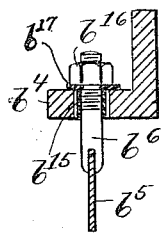
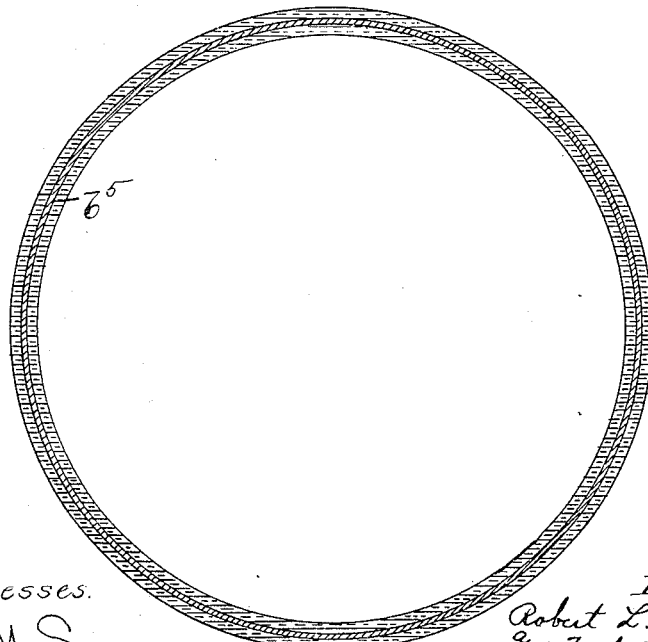

UNITED STATES PATENT OFFICE.

ROBERT L. FRINK AND FRED J. FRINK, OF LANCASTER, OHIO.

METHOD OF DRAWING GLASS.

972,616.   Specification of Letters Patent.   Patented Oct. 11, 1910.

Application filed March 18, 1910. Serial No. 550,133.

*To all whom it may concern:*

Be it known that we, ROBERT L. FRINK and FRED J. FRINK, citizens of the United States, and residents of Lancaster, county of Fairfield, State of Ohio, have jointly invented a new and useful Improvement in Methods of Drawing Glass, of which the following is a specification, the principle of the invention being herein explained and the best mode in which we have contemplated applying that principle, so as to distinguish it from other inventions.

As is well known, one of the more serious difficulties encountered in drawing glass cylinders by machine, in place of blowing them by hand as in the old method of manufacturing window glass, is the prevention of the breaking off of the glass from the bait or pipe by means of which it is being drawn. This difficulty arises from the different coefficients of expansion of the material of which such bait is constructed, usually iron, and the glass of the cylinder. So long as such glass remains above the temperature where it comes to a set, the novel, as the thickened portion of the cylinder in contact with the bait is called, can accommodate itself to changes in the relative diameter of itself and the bait. Once, however, such glass has set the further progress of the cooling operation inevitably involved the production of such strains in the glass composing the novel, as will cause a fracture in the cylinder. Aside from the directly disastrous consequences of such fracture which is apt to run in various directions, lengthwise as well as transversely, of the cylinder, or roller, the result is usually the breaking away of the cylinder from the bait, and the complete loss of the product.

It has heretofore been proposed to control the cooling of the bait both by the conservation of the heat received either previously or incidentally to the dipping of the bait in the molten glass at the beginning of the draw and by the application of heat from an outside source to such bait during the draw. The former method involves the use of an inclosure of heat insulating material for the bait and contiguous portion of the cylinder; while as one example of the latter method, reference may be made to the proposed use of gas burners suitably incased and disposed about the bait at the line of junction between the same and the cylinder. Another arrangement for thus applying heat to the bait consists of an electrical heating device contained within a hollow bait, as shown in the patent of R. L. Frink No. 915,282; and the use of an electric current as the heating medium has also been attempted by passing a current through a resistance coil encircling the bait adjacent to the latter's line of contact with the cylinder, much as the gas burners are disposed in the arrangement previously described. None of these arrangements, whereby the heat is applied to the bait gives satisfactory results in practice, although by the arrangement of the heating coil characterizing the structure of the patent referred to above, an approximation to the ideal condition desired has been reached. It will be understood, of course, that the control of the temperature of the bait is a very delicate matter in view of the fragile character of the glass, the various strains introduced by the cooling of the walls of the cylinder, and the not inconsiderable strain produced by the increased weight of the cylinder or roller and the increased viscosity of the bath, as the draw progresses. We have found, accordingly, that it is essential, if successful results are to be obtained in maintaining adhesive and cohesive contact between the cylinder and the bait during more than the relatively short period required for the temperature naturally to fall below the point of set in the glass, that the entire bait body be maintained at a uniform temperature, so that the contraction and expansion of the bait produced by variation in temperature may be uniform about its entire circumference, not only in linear dimensions but in actual volume also. This uniformity in heating effect we have found can be secured by constituting of the bait itself the resistance member in an electric circuit through which a heating electric current is being passed. By a proper construction, then, of such bait member and disposition of the leads from the circuit connected therewith, a substantially uniform flow of the current through the entire length of the bait may be secured and thus the results referred to above rendered possible.

Various arrangements of apparatus may be utilized in connection with our improved method, two slightly different forms being shown in a co-pending application, Serial No. 497,274 filed by R. L. Frink May 20, 1909 and another in another, Serial No. 548,490, filed by us March 10, 1910.

The steps involved in the present invention, along with one approved arrangement of means for carrying on such steps, will hereinafter be fully described and particularly pointed out in the claims.

The annexed drawings and the following description set forth in detail certain mechanism embodying the invention, such disclosed means constituting, however, but several of the various mechanical forms in which the principle of the invention may be used.

In said annexed drawings:—Figure 1 is a front elevation of glass drawing mechanism including an improved construction of bait adapted for the carrying on of the present process, such specific bait forming the subject matter of the second of the copending applications above described; Fig. 2 is a side elevation of such mechanism; Fig. 3 is a vertical sectional view of the bait member proper, with a portion of the cylinder attached thereto; Fig. 4 is a transverse section of the same taken on the line 4—4, Fig. 3; and Fig. 5 is a vertical sectional view of a detail.

The mechanism shown in Figs. 1 and 2 consists in general of a vertically reciprocable cage A from which the bait B is suspended so as to be movable toward and from the drawing pot C in which is contained the bath of molten glass from which the cylinder is to be drawn. The term "drawing pot" is here employed in a general sense to mean any suitable receptacle whether connected by a conduit directly with the glass tank, or arranged to be supplied by means of a ladle, or otherwise. Two vertical ways or guides $a$ are provided for the case, which is formed to engage therewith at its respective ends, while a cable $a'$ operated by a suitable hoisting mechanism at a proper rate of speed is similarly provided for raising and lowering the cage. In addition to the foregoing, two electric conductors in the form of trolley wires D, are provided to the rear of the path of travel of the cage and parallel with said ways.

In the approved construction illustrated, the cage comprises simply a frame made up of two transverse bars $a^2$ suitably joined together and braced by vertical bars $a^3$. Two intermediately positioned vertical bars $a^3$ are provided with forwardly projecting brackets $a^4$ in which are formed open trunnion bearings adapted to receive suitably formed lugs $b$ on rod-like arms $b'$ that extend upwardly from the bait body. As a result of this construction, such body, it will be seen, is capable of oscillation in the plane of Fig. 2. Such oscillation, however, is limited in a rearward direction by a stop arm $a^5$ extending downwardly from the frame of the cage into position to be engaged by the body when occupying its normal pendent position. Lugs $b$ are adjustably held on the arms $b'$ between nuts $b^{14}$.

To facilitate the removal and attachment of the bait, or other manipulation thereof, it is provided with two handles $b^2$, as shown in Figs. 1 and 3. The two brackets $a^4$ that thus serve to support the bait body are insulated from each other and from the frame of the cage, and are connected with the secondaries, or, in effect, themselves form continuations of the secondaries, of two transformer coils D', carried directly by the cage. The primaries $d'$ of such transformer lead to two trolley arms $d^2$ adapted to movably contact with the correspondingly disposed trolley wires. Variations in the coils themselves, whereby their transforming effect may be adjusted, is provided for by means of switches $d^3$ carried directly on the cage, while a rheostat $d^4$ is introduced into the circuit $D^3$ that includes the two trolley wires, so that the current supplied to the apparatus from the generator $D^2$ or other source of current, may also be varied in character. Such trolley wires are preferably shorter than the range of movement of the cage. To this end simply a breaker $d^6$ is introduced into each trolley wire, in order that the movement of the trolley arms may be in no wise interfered with, although various other means for interrupting the connection through the transformer on the cage will readily suggest themselves as a substitute for this.

The preferred construction of bait illustrated in connection with the foregoing drawing mechanism will be seen to comprise a body portion of general cylindrical form, preferably constructed of sheet metal or equivalent homogeneous electro-conductive material. Such body carries the handles $b^2$, one on its top and the other on the side, to which reference has been previously made. Such top, or cover, may also be provided, if desired, with means, as an adjustable slide bar $b^3$ whereby an opening of variable area is formed therein. To the lower edge of the body portion is firmly riveted a flange $b^4$ of angular cross section, such flange preferably projecting outwardly from the body, and to said flange in turn is secured the bait member $b^5$ proper. The latter in the form illustrated in figures just named consists simply of an attenuated metal band or ribbon in the form of a continuous circle, to the upper edge of which are riveted, or better still welded, a series of bolts $b^6$. The threaded ends of the latter are secured to, but electrically insulated from the flange, just described as being riveted to the lower edge of the bait body, by being passed through bushings $b^{15}$ of insulating material, while the nuts $b^{16}$ rest on similar washers $b^{17}$, as is shown in Fig. 5. As is further clearly illustrated in said figure, such bushing fits loosely in the hole provided therefor in the flange, and the bolt may also fit loosely in the bushing, so that a certain amount of transverse movement is permitted the bait member either as a whole, or as to a portion thereof, quite independently of the remainder. All this, however, is without in the least affecting the solidity with which said bait member is supported in a vertical direction. The two arms $b'$ that extend upwardly from such body and pivotally support the same from the cage, are connected at their lower ends to diametrically opposite portions of this band, so as to have good electrical contact therewith but said arms are otherwise, like the band, entirely electrically insulated from the body, the clamps $b^7$ whereby they are secured to the latter having bushings of insulating material. It will thus be seen that when the bait is in place suspended from the cage, and the trolley arms are in contact with the respective trolley wires, the electric circuit, including the dynamo or other generator is closed through transforming coils $D'$, the brackets $a^4$ arms $b'$, and the bait member connected with the lower ends of the latter. The current obviously divides and flows in multiple through such bait, but care is taken to have the respective portions thereof substantially equal in length and in cross section so that the heating effect of the current thus passed therethrough is substantially uniform throughout the whole circumferential extent of the band.

As a result of the manner in which the bait member proper, consisting in the form under consideration of a thin metal band or ribbon, is attached to the body portion of the bait, it will be obvious that such band is not only electrically insulated from said body portion, but substantially heat-insulated also, by reason of the relatively small heat conducting capacity of the spaced bolts or lugs $b^6$ that constitute the sole physical connection between such member and body portion.

Having thus described the general structural features of our improved glass drawing mechanism with particular regard to details of the bait which constitutes the important feature of such mechanism, the method of operation of the apparatus may be next noted. The bait having been hung in the cage, is preliminarily adjusted so that the bait member lies perfectly horizontal. This adjustment is effected in a plane parallel with the axis of the bait by raising or lowering the position of lugs $b$ on the upper end of the rods or arms $b'$ so as to correspondingly raise or lower the opposite sides of the bait member to which such arms are attached. A symmetrical distribution of the weight of the bait as a whole about its axis serves to level up such bait in a transverse plane, and if necessary additional weight may be attached on one side or the other to secure this result.

The cage is permitted to descend until the lower edge of the bait dips into the bath of glass in the drawing pot or receptacle C, adhesive and cohesive contact of the glass, that thereupon forms the novel of the cylinder, being secured with both the inner and outer faces of the bait member. After reversing the movement of the cage and bait, or in other words, after the draw proper is begun, the current is turned on so as to pass through the bait member, such turning on being timed to precede any excessive drop in temperature, the temperature at which it is desirable to maintain the bait during the draw being above the second point of tension in the glass, that is above the point where the glass comes to a set; glass men generally speaking of glass as having two points of tension, the first point being from 1200 to 1400 degrees, Fahrenheit, where de-vitrification, or crystallization, takes place, and the second being in the neighborhood of 900 degrees, Fahrenheit. The volume and character of the current that is passed through the bait is accordingly regulated, having due regard to the electrical resistance of the latter, so as to maintain said bait at a temperature above such last-named point, and thus enable the glass in the novel, whether contacting with the inner or outer face of the bait, to accommodate itself without rupture to any relative displacement of said member incident to a change in their common temperature. This regulation of the electric circuit, and thus of the temperature, is effected, in the first place, by adjusting the transformer coil connections by means of switches $d^3$, so as to provide with the current available in the main line, a current in the secondaries, which include in circuit therewith the bait member proper, a current appropriate to the size of the bait, or in other words, the size of the sheet or cylinder being drawn. For varying the current during any particular drawing operation, with the transformer coils thus adjusted, the rheostat $d^4$ is utilized.

The rate of the draw, as the bait emerges from the bath of molten glass is controlled so as not only to permit the formation of an adequate novel, but also to cause a slight thickening of the cylinder walls at points equally spaced from and located just below such novel, as clearly shown in Fig. 3. Thereafter the speed at which the bait is raised is made such as to produce glass of the desired thickness. In place of thus making the walls thicker than normal at a point below the novel they may be drawn thinner.

The diagrammatic sectional views of the bait member with novel attached, shown in Figs. 3 and 4, are designed to render clear the effect of changing temperatures in this portion of the cylinder, or sheet, of glass being drawn, as the case may be, and thus the significance of our improved method of controlling such temperatures rendered possible by the apparatus hereinbefore described. The section of the bait member therein appearing, is shown as inclosed to approximately the degree actually found in practice by the glass forming the upper end or novel of the cylinder. Of course, both this member and the novel will initially, that is when the member is dipped into the bath of molten glass, have approximately the same temperature as that of such bath. Immediately, however, the drawing process proper is begun, the member and the novel begin to lose heat by radiation and convection, and in a limited degree, by conduction through the bolts, rivets, or equivalent means whereby the member is attached to the body portion of the bait. It has been explained, however, that this latter form of loss is reduced to a minimum by the construction of such attaching means. As such cooling progresses, a corresponding change occurs in the cubical contents or three-way dimensions of both the bait member and the novel, but owing to the different materials of which these are respectively composed, the band constituting the member will tend to contract more than the glass. The inner portion of the novel, is, hence, put under a compression strain and the outer portion under a tension strain, which strains if allowed to become too great produce a rupture at the point of attachment of the novel to the bait. This tendency to rupture, it has been explained, is avoided by maintaining the temperature of the bait and the attached glass above the point at which such strains are present to a harmful degree, and in this way the glass is maintained in contact with the bait member. This contact may be adhesive or cohesive, with or without any oxid intermediate the glass and bait member, hence by the use of the words "adhering" or "immediate" in the claims, we intend to include and cover any direct attachment between the bait and glass without the employment of clamps or other mechanical attaching connecting device. This very tendency to rupture, however, upon allowing the temperature of bait and novel to fall below such predetermined point, we utilize to sever the cylinder from the bait upon the conclusion of the drawing operation. In other words, it is a matter of but a relatively few moments after the current is turned off through the bait, before the cylinder will snap off from the bait, and by properly controlling the resulting fracture, as by making the walls thicker just below the novel, the rather difficult task of severing the cylinder from the bait, involved in the prevailing practice, is easily accomplished.

A part of the advantageous results that have been obtained in practice by our improved construction of bait, is attributable to the flexibility of the bait member proper and to the mode of attaching said member to the support, or body member, whereby the former is permitted to accommodate itself by flexure in a horizontal plane to varying conditions of strain in the cylinder or roller suspended therefrom. While a satisfactory degree of flexibility may be obtained where the yielding character of the attaching bolts alone is relied on, we prefer to provide for the independent shifting movement of such bolts in the supporting flange, as has been hereinbefore described. By reason of this mechanical adjustability of the bait, we are warranted in referring to our improved method as one wherein the head of the cylinder is flexibly attached to the drawing support, as well as one in which the temperature of the bait member, that forms the means of such attachment, is artificially regulated by passing a heating electric current therethrough.

Other modes of applying the principle of our invention may be employed instead of the one explained, change being made as regards the process herein disclosed, provided the step or steps stated by any one of the following claims or the equivalent of such stated step or steps be employed.

We therefore particularly point out and distinctly claim as our invention:—

1. The herein described method of drawing glass consisting in lowering a bait member into and raising it from a bath of molten glass, and maintaining the glass in immediate contact with said bait member, as the latter is raised, by passing a heating electrical current therethrough.

2. The method of drawing glass, which consists in lowering into and raising from a bath of molten glass a bait member having a co-efficient of expansion different from that of glass, and artificially maintaining the temperature of said member within the glass at a point such that the glass in contact therewith is kept from setting and thus enabled to accommodate itself without rupture to any relative displacement of said member incident to a change in their temperature, substantially as described.

3. The method of making glass cylinders, which consists in lowering into and raising from a bath of molten glass a circular metallic bait member having a co-efficient of expansion different from that of glass, and passing a heating electric current through said member, said current being regulated to maintain the temperature of said member at such a point that the glass in contact therewith is kept from setting and thus enabled to accommodate itself without rupture to any relative displacement of said member incident to a change in their temperature, and then interrupting such current whereby such rupture is permitted and the glass cylinder thus severed from the bait, substantially as described.

4. The method of making glass cylinders, which consists in lowering into a bath of molten glass a bait member having a co-efficient of expansion different from that of glass; raising said bait member from such bath with the novel clinging thereto and proceeding with the draw; and artificially heating said member during all of such draw save the initial stage of forming of the novel, substantially as described.

5. The method of making glass cylinders, which consists in lowering into a bath of molten glass a bait member having a co-efficient of expansion different from that of glass; raising said bait member from such bath with the novel clinging thereto and proceeding with the draw; and passing a heating electric current through said member when the glass in such novel has cooled to approximately the second point of tension, said current being regulated to maintain the temperature of said member at a point such that said novel is kept from setting and thus enabled to accommodate itself without rupture to any relative displacement of said member incident to a change in the latter's temperature and that of such novel, substantially as described.

6. A method of drawing glass consisting in lowering a bait member having a coefficient of expansion different from that of glass, into a bath of molten glass whereby the glass is caused to adhere to the bait, raising the bait with the attached glass, and maintaining the bait at a substantially equable temperature throughout the contacting area, such temperature being sufficient to prevent the glass from setting whereby the said glass may accommodate itself without rupture to any relative displacement of said bait member incident to any fluctuation of temperature therein.

7. The method of drawing glass articles consisting in lowering a bait into a bath of molten glass whereby the glass is caused to adhere thereto, raising the bait with the adhering glass, and heating the bait by a heating electric current passing through same, whereby the glass is maintained in a mobile condition and prevented from setting.

8. The method of making glass cylinders, which consists in lowering into and raising from a bath of molten glass a bait member having a co-efficient of expansion different from that of the glass; electrically maintaining the temperature of said member during the draw at a point such that the glass in contact therewith is kept from setting and thus enabled to accommodate itself without rupture to any relative displacement of said member incident to a change in their temperature; and then permitting the temperature of said member to drop when the draw is concluded, whereby the cylinder is caused to break off from said member, the cylinder walls being drawn of an increased thickness at points equally spaced from and located just below the portion thus in contact with said member.

9. The method of making glass cylinders, which consists in lowering into and raising from a bath of molten glass a bait member of homogeneous electro-conductivity material having a co-efficient of expansion different from that of the glass; passing a heating electric current through said member, said current being regulated to maintain the temperature of said member during the draw at a point such that the glass in contact therewith is kept from setting and thus enabled to accommodate itself without rupture to any relative displacement of said member incident to a change in their temperature; and then interrupting the passage of such current through said member when the draw is concluded, whereby the temperature of the latter is permitted to drop and the cylinder is caused to break off from said member; the cylinder wall being drawn of an increased thickness at points equally spaced from and located just below the portion thus in contact with said member.

10. The method of making glass cylinders, which consists in lowering into and raising from a bath of molten glass a bait member of metal having a co-efficient of expansion different from that of the glass, the novel of the cylinder being drawn having adhesive and cohesive contact with both the inner and outer faces of said member; artificially maintaining the temperature of said member during the draw at a point such that the glass in such cylinder novel is kept from setting and thus enabled to accommodate itself without rupture to any relative displacement of said member incident to a change in the temperature; and then interrupting the passage of such current through said member when the draw is concluded, whereby the portion of such cylinder novel in contact with the inner face of said member is put under compression owing to the relatively greater contractibility of said member, whereby the cylinder is caused to break off from said member, substantially as described.

11. The method of making glass cylinders, which consists in lowering into and raising from a bath of molten glass a bait member of metal having a co-efficient of expansion different from that of the glass, the novel of the cylinder being drawn having adhesive and cohesive contact with both the inner and outer faces of said member; artificially maintaining the temperature of said member during the draw at a point such that the glass in such cylinder novel is kept from setting and thus enabled to accommodate itself without rupture to any relative displacement of said member incident to a change in their temperature; and then interrupting the passage of such current through said member when the draw is concluded, whereby the portion of such cylinder novel in contact with the inner face of said member is put under compression owing to the relative greater contractibility of said member, whereby the cylinder is caused to break off from said member, the cylinder walls being drawn of an increased thickness at points equally spaced from and located just below such novel.

12. A method of drawing glass cylinders consisting in lowering into a bath of molten glass a bait member initially heating such member by contact with the molten glass, raising the bait with the head of the cylinder attached thereto and allowing the novel to form and then electrically maintaining the temperature of such member that the portion inclosed by the novel shall be of such temperature as to prevent rupture, throughout the remainder of the draw.

13. The herein described method of drawing glass articles from a bath of molten glass, consisting in lowering a bait, carried by a support, into the bath so as to cause the glass to adhere to the bait, raising the bait, and maintaining adhesion between the bait and glass, and mobile attachment of the article to the support, by an electrical heating current passing through the bait.

Signed by us this 15th day of March, 1910.

ROBERT L. FRINK.
FRED J. FRINK.

Attested by:
W. K. MARTIN,
CHARLES WANDLESS.